US010811702B2

(12) United States Patent
Verdier et al.

(10) Patent No.: US 10,811,702 B2
(45) Date of Patent: Oct. 20, 2020

(54) FUEL CELL PROVIDED WITH A TEMPERATURE-CONTROL SYSTEM AND METHOD FOR THERMAL CONTROL OF THE CELL

(71) Applicant: SAFRAN POWER UNITS, Toulouse (FR)

(72) Inventors: Antoine Verdier, Grand Couronne (FR); Théophile Horde, Suresnes (FR); Fabien Boudjemaa, Garches (FR)

(73) Assignee: Safran Power Units, Toulouse (FR)

( * ) Notice: Subject to any disclaimer, the term of this patent is extended or adjusted under 35 U.S.C. 154(b) by 296 days.

(21) Appl. No.: 15/759,912

(22) PCT Filed: Sep. 12, 2016

(86) PCT No.: PCT/FR2016/052284
§ 371 (c)(1),
(2) Date: Mar. 14, 2018

(87) PCT Pub. No.: WO2017/046495
PCT Pub. Date: Mar. 23, 2017

(65) Prior Publication Data
US 2018/0254497 A1   Sep. 6, 2018

(30) Foreign Application Priority Data

Sep. 15, 2015 (FR) ..................... 15 58596

(51) Int. Cl.
*H01M 8/04007* (2016.01)
*H01M 8/04225* (2016.01)
*H01M 8/04701* (2016.01)
*H01M 8/04223* (2016.01)
*H01M 8/043* (2016.01)
*H01M 8/0202* (2016.01)
*H01M 8/1004* (2016.01)
*H01M 8/0258* (2016.01)

(52) U.S. Cl.
CPC ..... *H01M 8/04074* (2013.01); *H01M 8/0202* (2013.01); *H01M 8/0258* (2013.01); *H01M 8/043* (2016.02); *H01M 8/04037* (2013.01); *H01M 8/04059* (2013.01); *H01M 8/04225* (2016.02); *H01M 8/04268* (2013.01); *H01M 8/04731* (2013.01); *H01M 8/04738* (2013.01); *H01M 8/1004* (2013.01)

(58) Field of Classification Search
CPC ............ H01M 8/0202; H01M 8/0258; H01M 8/04037; H01M 8/04059; H01M 8/04074; H01M 8/04225; H01M 8/04268; H01M 8/043; H01M 8/04731; H01M 8/04738; H01M 8/1004
See application file for complete search history.

(56) References Cited

U.S. PATENT DOCUMENTS

| 2003/0235735 | A1 | 12/2003 | Miyazawa et al. |
| 2009/0181272 | A1 | 7/2009 | Shin et al. |
| 2009/0214913 | A1* | 8/2009 | Gschwind ......... H01M 8/04014 429/437 |
| 2009/0239106 | A1* | 9/2009 | Whitehead ............. F24H 1/009 429/415 |
| 2012/0118878 | A1* | 5/2012 | Kim .................. H01M 8/04029 219/660 |

FOREIGN PATENT DOCUMENTS

WO   2007/064338 A1   6/2007

OTHER PUBLICATIONS

Rulliere, R.-Etudes Experimentale et Theorique de Diffuseurs Thermiques Diphasiques,Application au Refroidissement de Systemes Dissipatifs, thesis presented on Dec. 8, 2006, available online http://theses.insa-lyon.fr/publication/2006ISAL0114/these.pdf (Year: 2006).*
International Search Report and translation dated Dec. 5, 2016, in International Application No. PCT/FR2016/052284 (7 pages).

* cited by examiner

*Primary Examiner* — Anca Eoff
(74) *Attorney, Agent, or Firm* — Bookoff McAndrews, PLLC

(57) ABSTRACT

The invention relates to a fuel cell (10) comprising a membrane electrode assembly (16) and two gas diffusion layers (14) co-operating with the assembly to form a unit cell (12). The fuel cell (10) also has a two-phase thermal diffuser (24) having a condensation zone and an evaporation zone, the evaporation zone being arranged between the bipolar plates (14) of two adjacent unit cells (12). The two-phase thermal diffuser (24) also has a heating element arranged in the condensation zone. The invention also provides a system comprising the fuel cell and a controller, and it also provides a method of regulating the temperature of the fuel cell.

8 Claims, 4 Drawing Sheets

FUEL CELL PROVIDED WITH A TEMPERATURE-CONTROL SYSTEM AND METHOD FOR THERMAL CONTROL OF THE CELL

CROSS-REFERENCE TO RELATED APPLICATION(S)

This patent application is a U.S. national phase entry under 35 U.S.C. § 371 of International Application No. PCT/FR2016/052284, filed Sep. 12, 2016, which claims priority under 35 U.S.C. § 119 to French Patent Application No. 1558596, filed Sep. 15, 2015.

BACKGROUND OF THE INVENTION

The present invention relates to a fuel cell including a system for regulating the temperature of the fuel cell, and in particular a proton exchange membrane cell.

Fuel cells generally comprise a stack of unit cells arranged between two current collectors. Each unit cell is made up of a membrane electrode assembly made up of a proton exchange membrane arranged between an anode electrode and a cathode electrode, the assembly being arranged between two bipolar plates, the membrane electrode assembly is itself arranged between two distributor plates, also referred to as bipolar plates. When stacking unit cells, the distributor plates arranged between two membrane electrode assemblies allow hydrogen to flow over one of their faces and air over the opposite face, and they are also called bipolar plates.

Each fuel cell has an optimum operating temperature that depends on the nature of the various components making up the cell. Thus, in order to guarantee optimum operation and a maximum lifetime for the fuel cell, it is recommended for it to be possible to maintain the cell at a temperature close to said optimum temperature, and to do so in a manner that is uniform throughout the stack.

Unfortunately, in operation, the electrochemical reaction that takes place within each unit cell is an exothermic reaction such that if it is desired to maintain the temperature of the cell at a temperature close to the optimum operating temperature, it is advantageous to cool the fuel cell. In known manner, the device for cooling the cell comprises a pump for circulating cooling liquid, thereby increasing the overall size of the fuel cell and consuming energy.

Furthermore, in order to initiate the electrochemical reaction and maximize the energy efficiency of the cell quickly, it is recommended to preheat the fuel cell, given that the optimum operating temperature of the cell is generally higher than ambient temperature. Such preheating may be performed using heating resistances arranged at the ends of the fuel cell. It can thus be understood that the preheating of the cell is not uniform within the stack. Specifically, unit cells arranged at the center of the stack have a temperature that is lower than the temperature of unit cells arranged in the proximity of the ends of the fuel cell.

It can thus be understood that it is known to perform the preheating function by using a heating device and the cooling function by using a cooling device that is distinct from the heating device. Both of those devices are arranged in the fuel cell. Although such an arrangement makes it possible to regulate the temperature of the fuel cell, it implies in particular a significant increase in the weight and the size of the cell. Furthermore, the arrangement of the unit cells and of the heating and cooling devices can be complex.

OBJECT AND SUMMARY OF THE INVENTION

The present invention seeks to remedy those drawbacks, at least in part.

To this end, the invention provides a fuel cell comprising:
  a membrane electrode assembly comprising a proton exchange membrane arranged between an anode and a cathode;
  two bipolar plates arranged on either side of the membrane electrode assembly and co-operating with the membrane electrode assembly to form a unit cell; and
  a two-phase thermal diffuser having a condensation zone and an evaporation zone, the evaporation zone being arranged between the bipolar plates of two adjacent unit cells;
wherein the two-phase thermal diffuser further includes a heating element arranged in the condensation zone of the two-phase thermal diffuser.

By incorporating a heating element in the condensation zone of the two-phase thermal diffuser, the functions of cooling and heating the fuel cell are combined in the two-phase thermal diffuser, thereby simplifying fabrication of the fuel cell and reducing its size. Specifically, there is no longer any need to provide within the fuel cell both a cooling system and a heating system that is distinct from the cooling system.

Furthermore, the arrangement of the evaporation zone of the two-phase thermal diffuser between two adjacent unit cells enables the fuel cell to be heated or cooled in a manner that is more uniform and more effective than, for example, when the fuel cell is heated by heating resistances arranged at each end of the fuel cell. Specifically, the heat exchange area between the two-phase thermal diffuser and the unit cells is relatively large because the area of the evaporation zone in contact with the bipolar plates may, by way of example, have the same dimensions as the bipolar plates, thereby maximizing the heat exchange area between the evaporation zone and the bipolar plates.

Furthermore, it is possible to have a plurality of two-phase thermal diffusers within the fuel cell between different adjacent unit cells. This increases the uniformity with which the fuel cell is heated or cooled and also the effectiveness with which temperature is regulated within the fuel cell.

In addition, the use of a two-phase thermal diffuser makes it possible to avoid the presence of a pump for causing a liquid to circulate between the unit cells of the fuel cell.

The heating element may comprise a heating resistance, an inductive element, a hot fluid flow tube, a hot gas flow fin, a burner, or a pyrotechnic element.

Depending on the type of energy available and on the constraints imposed by the assembly including the fuel cell, it is preferable to use a given type of heating element. For example, if the fuel cell is integrated in an assembly in which a hot gas flows, it is possible to recover a portion of the hot gas for preheating the fuel cell.

The two-phase thermal diffuser may be arranged between two unit cells, once every N unit cells, where N is a natural integer greater than or equal to 1, preferably greater than or equal to 3, more preferably greater than or equal to 5.

Since the exchange of heat between the unit cells and the two-phase thermal diffusers is of good quality, it is possible to arrange a two-phase thermal diffuser once every three, five, ten, or fifteen unit cells, for example.

The two-phase thermal diffuser may constitute a current collector plate of the fuel cell.

Since the two-phase thermal diffuser is a good conductor of electricity, it may also be used as a current collector plate. This simplifies fabrication of the fuel cell. Specifically, the fuel cell is then made up of unit cells and of two-phase thermal diffusers.

The invention also provides a system comprising a fuel cell as defined above and a controller, the controller being configured to control the heating element so that during a preheating stage the heating element heats the fuel cell up to a predetermined temperature, and during a stage of operation under steady conditions, the heating element is switched off so that the two-phase thermal diffuser keeps the temperature of the fuel cell in a given range.

The controller may also be configured to control a heat sink.

The invention also provides a method for thermal control of a fuel cell as defined above and comprising the following steps:
 during a preheating stage, a controller controls the heating element so that the heating element heats the fuel cell up to a predetermined temperature; and
 during a stage of operation under steady conditions, the controller switches off the heating element so that the two-phase thermal diffuser keeps the temperature of the fuel cell in a given range.

The controller may also control a heat sink.

BRIEF DESCRIPTION OF THE DRAWINGS

Other characteristics and advantages of the invention appear from the following description of embodiments of the invention given as non-limiting examples and with reference to the accompanying figures, in which.

DETAILED DESCRIPTION OF THE INVENTION

Figure 1:
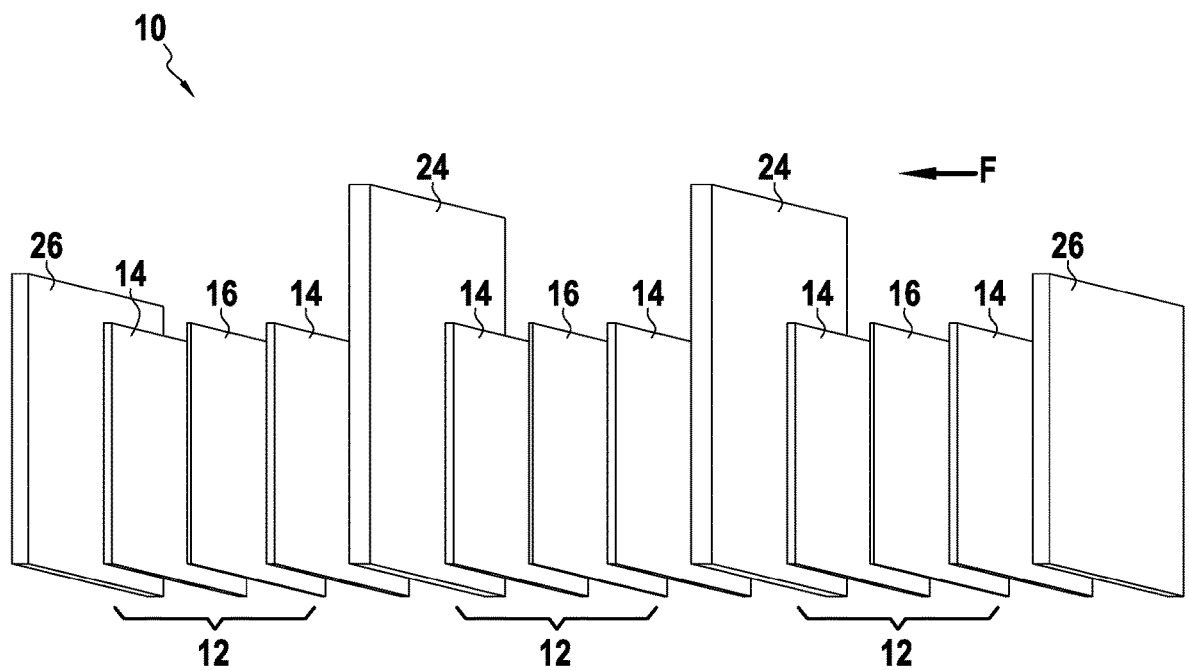
FIG. 1 is an exploded diagrammatic view of a fuel cell in a first embodiment.
Figure 2:
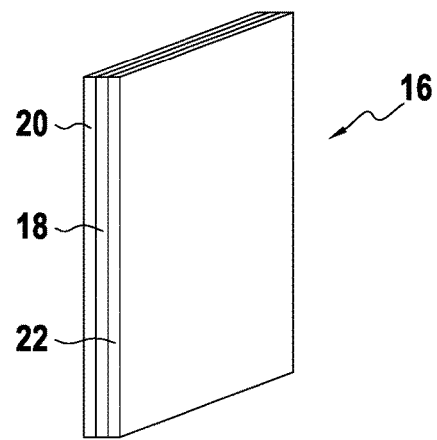
FIG. 2 is a perspective view of a membrane electrode assembly.

FIG. 1 is an exploded diagrammatic view of a fuel cell 10. The fuel cell 10 comprises three unit cells 12, each comprising two bipolar plates 14 arranged on either side of a membrane electrode assembly 16. The membrane electrode assembly 16 shown in FIG. 2 comprises a proton exchange membrane 18 arranged between an anode 20 and a cathode 22. Each unit cell 12 is separated from the adjacent unit cell 12 by a two-phase thermal diffuser 24. Each two-phase thermal diffuser 24 is thus arranged between two bipolar plates 14 of two adjacent unit cells 12. The fuel cell 10 also has a current collector plate 26 at each of its ends.

It can be understood that in the fuel cell 10, the various elements shown in the exploded view are in contact with one another.

Figure 3:
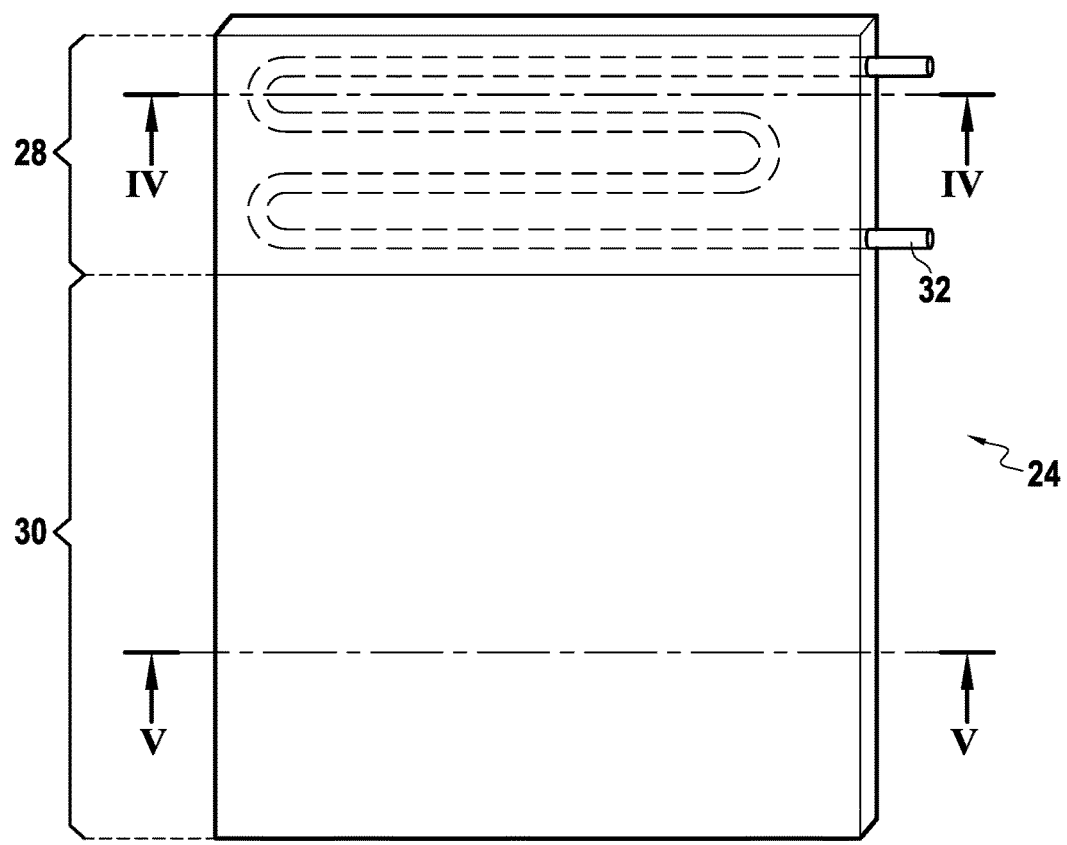
FIG. 3 is a perspective view of a two-phase thermal diffuser including a heating element.
Figure 4:
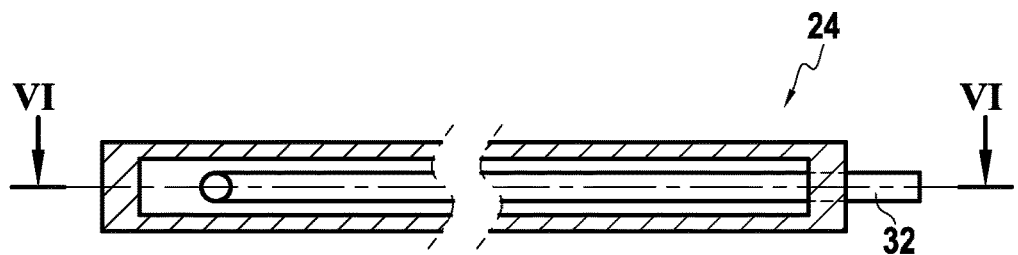
FIGS. 4 and 5 are cross-sectional views of the FIG. 3 two-phase thermal diffuser in planes IV-IV and V-V.
Figure 5:
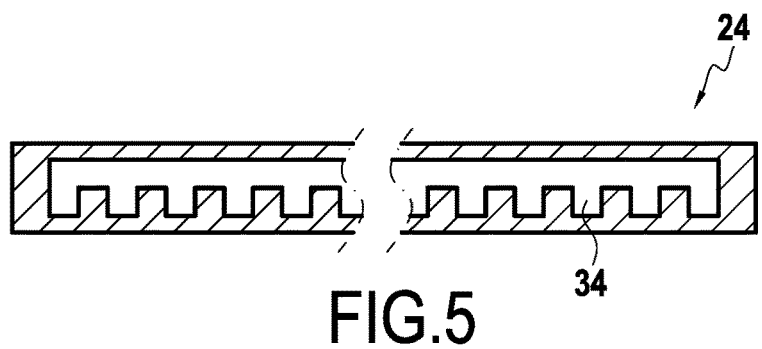
Figure 6:
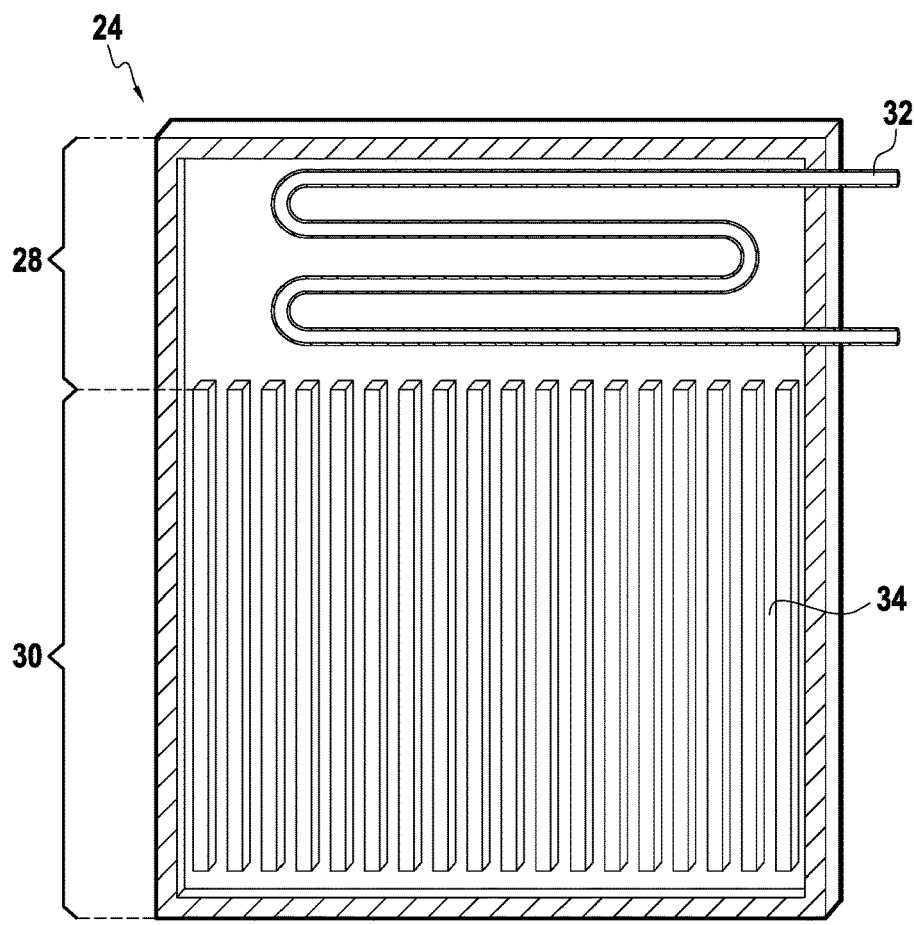
FIG. 6 is a cross-sectional view of the FIG. 3 thermal diffuser in plane VI-VI of FIG. 4.

FIG. 3 shows a two-phase thermal diffuser 24 that has a condensation zone 28 and an evaporation zone 30 together with a heating element 32 arranged in the condensation zone 28. As shown in FIG. 1, the evaporation zone 30 is arranged between the bipolar plates 14 of the fuel cell 10 and the condensation zone 28 is thermally coupled with a heat sink F, e.g. a fluid such as a gas or a liquid.

In the fuel cell 10, the evaporation zone 30 is thus in contact with the bipolar plates 14 in order to provide good heat exchange between the unit cell 12 and the two-phase thermal diffuser 24 and the condensation zone 28 is not in contact with the bipolar plates 14, but projects from the bipolar plates 14.

The two-phase thermal diffuser 24 is made of a material having high thermal conductivity, e.g. copper, and it contains a liquid that is selected as a function of a given temperature range in which the fuel cell is maintained while it is operating under steady conditions. This temperature range lies within ±10° C. from the optimum operating temperature of the fuel cell 10, or indeed preferably in the range ±5° C. from the optimum operating temperature for the fuel cell 10.

Figure 7:
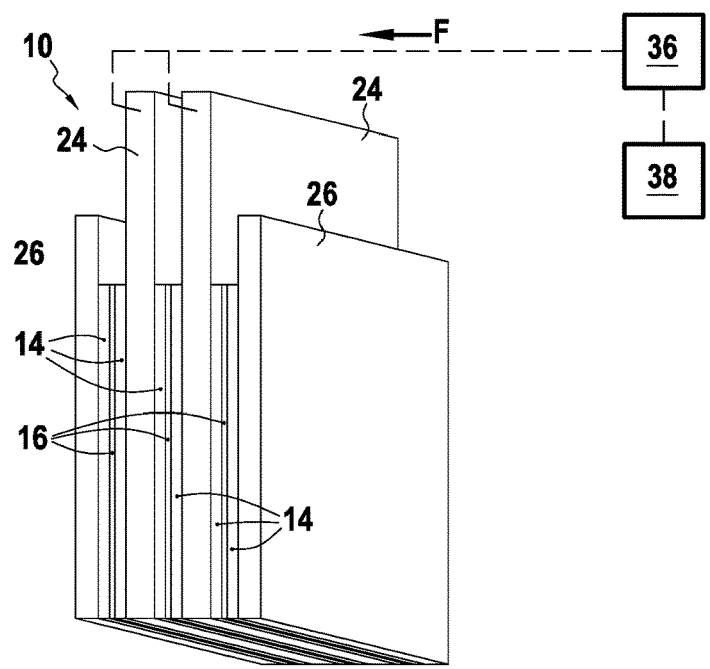
FIG. 7 is a perspective view of a system including the FIG. 1 fuel cell.

FIG. 7 shows a system comprising the FIG. 1 fuel cell together with a controller 36.

When starting the fuel cell 10, i.e. during the preheating stage I, the fuel cell 10 needs to be preheated in order to initiate the electrochemical reaction within the unit cells 12 and maximize the energy efficiency as quickly as possible.

During this preheating stage I, the controller 36 controls the heating element 32, which passes from an inactive state to an active state, i.e. the heating element 32 heats the two-phase thermal diffuser 24, which in turn heats the unit cells 12 situated on either side of the two-phase thermal diffuser 24.

Figure 8:
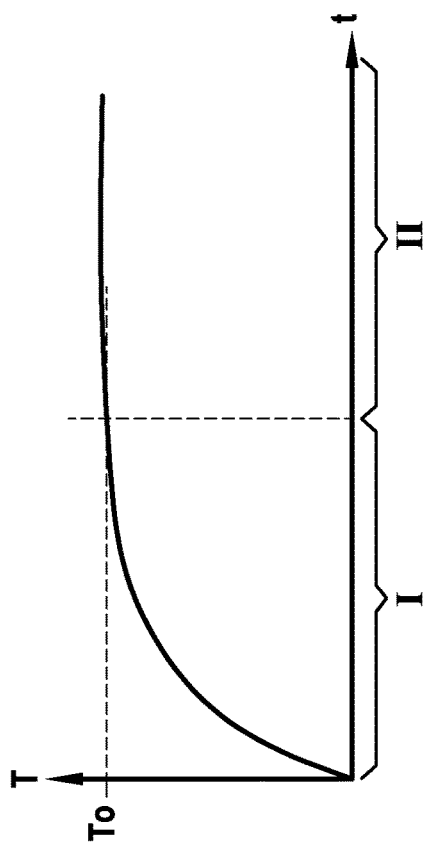
FIG. 8 is a graph showing temperature variation as a function of time for a fuel cell.

As shown in FIG. 8, the temperature T within the fuel cell 10 increases over time until it reaches a predetermined temperature To.

When the predetermined temperature To is reached, the fuel cell 10 switches to a stage II of operating under stable conditions. The controller 36 switches off the heating element 32.

The electrochemical reaction taking place within each unit cell 12 is an exothermic reaction, so the two-phase thermal diffuser 24 cools the unit cells 12 between which it is arranged so as to keep the temperature of the fuel cell 10 in a given range.

The liquid contained in the two-phase thermal diffuser 24 is driven by gravity to the evaporation zone 30 that is provided with microchannels 34. By capillarity, these microchannels 34 serve to pump the liquid contained in the condensation zone 28 to the evaporation zone 30.

On coming into contact with the unit cells 12, the liquid contained in the evaporation zone 30 heats up and evaporates. By natural convection, this vapor is driven into the condensation zone 28, which is thermally coupled with the heat sink F.

On contact with the heat sink F, the vapor contained in the condensation zone 28 is transformed into liquid, which under gravity and capillarity pumping, is driven into the evaporation zone 30.

It can thus be understood that the heat from the unit cells 12 of the fuel cell 10 is dissipated by the two-phase thermal diffuser 24.

The controller 36 controls the heat sink F, e.g. by controlling the speed of rotation of a fan 38 if the fluid of the heat sink F is a gas, e.g. such as air, so that the two-phase thermal diffuser 24 keeps the temperature of the fuel cell 10 in a given range. In practice, if the temperature of the fuel cell 10 leaves the given temperature range, the controller 36 increases or decreases the speed of rotation of the fan 38 respectively for the purpose of increasing or decreasing the quantity of heat that is dissipated by the two-phase thermal diffuser 24, so as to act respectively to reduce or increase the temperature of the fuel cell 10.

Figure 9:
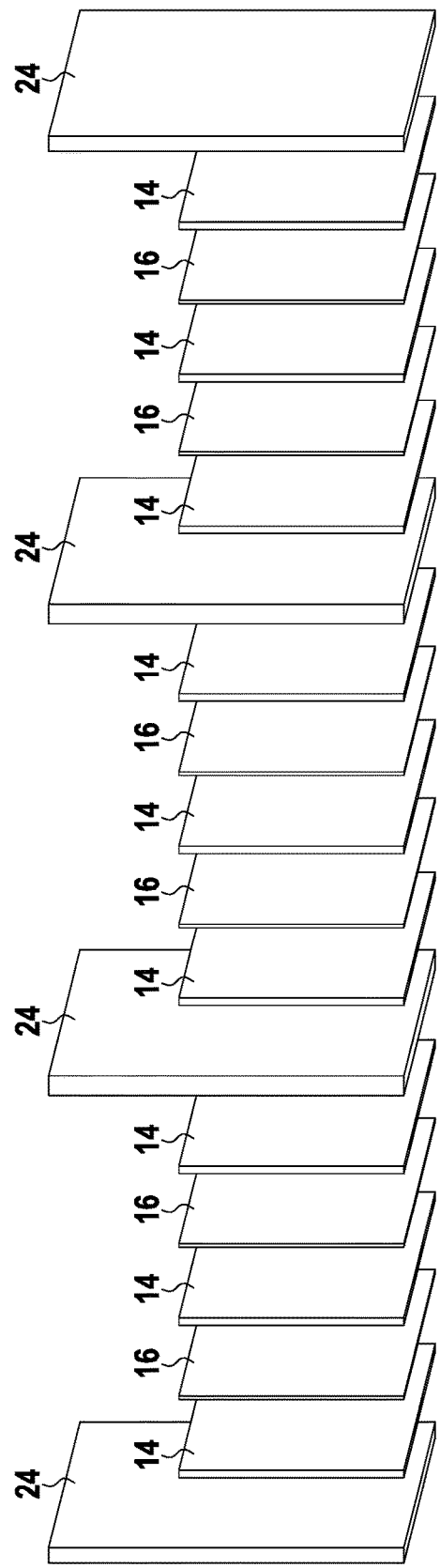
FIG. 9 is an exploded diagrammatic view of a fuel cell in a second embodiment.

In a second embodiment shown in FIG. 9, two unit cells 12 are mounted between two two-phase thermal diffusers 24, and two two-phase thermal diffusers 24 are arranged at each end of the fuel cell 10. The current collector plates of the fuel cell 10 are thus formed by the two-phase thermal diffusers 24.

In the embodiment of FIG. 9, certain bipolar plates 14 are arranged between two membrane electrode assemblies.

Although the present invention is described with reference to a specific embodiment, it is clear that various modifications and changes can be undertaken on those examples without going beyond the general ambit of the invention as defined by the claims. In addition, individual characteristics of the various embodiments mentioned may be combined in additional embodiments. Consequently, the description and the drawings should be considered in a sense that is illustrative rather than restrictive.

In particular, in FIG. 1, the fuel cell 10 has a stack of three unit cells 12. It should be understood that this example is not limiting.

Furthermore, the fluid of the heat sink F may be a liquid, and under such circumstances the fan 38 may be replaced by a pump. FIG. 7 also shows a system including a fan 38. Nevertheless, the fuel cell 10 can operate without a fan 38, e.g. when the natural convection of air around the fuel cell 10 suffices to keep the temperature of the fuel cell 10 in the given temperature range. Likewise, when the fluid of the heat sink F is a liquid, it is possible to consider doing without a pump if the natural convection of the liquid enables the temperature of the fuel cell to be kept in the given temperature range.

Furthermore, the predetermined temperature To may be equal to the optimum operating temperature of the fuel cell 10. Nevertheless, for reasons of thermal inertia, the predetermined temperature may also be different from the optional operating temperature of the fuel cell 10.

The invention claimed is:

1. A fuel cell, wherein the fuel cell comprises:
   (a) a plurality of unit cells, wherein each unit cell comprises:
      (a1) a membrane electrode assembly comprising a proton exchange membrane arranged between an anode and a cathode; and
      (a2) two bipolar plates arranged on either side of the membrane electrode assembly and co-operating with the membrane electrode assembly to form a unit cell; and
   (b) a two-phase thermal diffuser having a condensation zone and an evaporation zone, the evaporation zone being arranged between the bipolar plates of two adjacent unit cells;
   wherein the two-phase thermal diffuser further includes a heating element arranged in the condensation zone of the two-phase thermal diffuser.

2. A fuel cell according to claim 1, wherein the heating element comprises a heating resistance, an inductive element, a hot fluid flow tube, a hot gas flow fin, a burner, or a pyrotechnic element.

3. A fuel cell according to claim 1, wherein the two-phase thermal diffuser is arranged between two unit cells, once every N unit cells, where N is a natural integer greater than or equal to 1.

4. A fuel cell according to claim 1, wherein the two-phase thermal diffuser constitutes a current collector plate of the fuel cell.

5. A system comprising a fuel cell according to claim 1 and a controller, wherein the controller is configured to control the heating element so that during a preheating stage the heating element heats the fuel cell up to a predetermined temperature, and during a stage of operation under steady conditions, the heating element is switched off so that the two-phase thermal diffuser keeps the temperature of the fuel cell in a given range.

6. A system according to claim 5, wherein the controller is also configured to control a heat sink.

7. A temperature regulation method for regulating the temperature of a fuel cell according to claim 1, wherein the method comprises the following steps:
   during a preheating stage, a controller controls the heating element so that the heating element heats the fuel cell up to a predetermined temperature; and
   during a stage of operation under steady conditions, the controller switches off the heating element so that the two-phase thermal diffuser keeps the temperature of the fuel cell in a given range.

8. A temperature regulation method according to claim 7, wherein the controller further controls a heat sink.

* * * * *